United States Patent
Pasquier

(10) Patent No.: US 9,688,329 B2
(45) Date of Patent: Jun. 27, 2017

(54) ERGONOMIC SEAT FOR A CYCLE

(71) Applicant: Philippe Pasquier, Brussels (BE)

(72) Inventor: Philippe Pasquier, Brussels (BE)

(*) Notice: Subject to any disclaimer, the term of this patent is extended or adjusted under 35 U.S.C. 154(b) by 0 days.

(21) Appl. No.: 14/911,306

(22) PCT Filed: Aug. 12, 2014

(86) PCT No.: PCT/EP2014/067214
§ 371 (c)(1),
(2) Date: Feb. 10, 2016

(87) PCT Pub. No.: WO2015/022307
PCT Pub. Date: Feb. 19, 2015

(65) Prior Publication Data
US 2016/0200382 A1   Jul. 14, 2016

(30) Foreign Application Priority Data

Aug. 13, 2013  (BE) .................................. 2013/0542

(51) Int. Cl.
*B62J 1/00* (2006.01)
*B62J 1/04* (2006.01)
(52) U.S. Cl.
CPC ..................... *B62J 1/005* (2013.01)
(58) Field of Classification Search
CPC ....................................................... B62J 1/005
USPC ................................................. 297/201, 202
See application file for complete search history.

(56) References Cited

U.S. PATENT DOCUMENTS

| | | | | |
|---|---|---|---|---|
| 575,509 A | * | 1/1897 | Newell | B62J 1/02 297/201 |
| 576,192 A | * | 2/1897 | Hoyt | B62J 1/005 297/201 |
| 4,089,559 A | * | 5/1978 | Prange | B62J 1/002 297/201 |
| 4,369,998 A | * | 1/1983 | Blase | B62J 1/08 297/201 |
| 4,387,925 A | * | 6/1983 | Barker | B62J 1/002 297/201 X |

(Continued)

FOREIGN PATENT DOCUMENTS

| | | |
|---|---|---|
| DE | 20311739 U1 | 11/2003 |
| EP | 0467541 A1 | 6/1991 |

(Continued)

OTHER PUBLICATIONS

English-language translation of Written Opinion for Application No. PCT/EP2014/067214 dated Feb. 25, 2016.

(Continued)

*Primary Examiner* — Rodney B White
(74) *Attorney, Agent, or Firm* — Norris McLaughlin & Marcus, P.A.

(57) ABSTRACT

An ergonomic seat for a cycle and a manufacturing method of said seat comprise two seating surfaces that are curved upward and forward to allow a user to be supported continuously in the precise anatomical regions situated under each ischium, under the upper dorsal part of the thighs as far as a ventro-lateral part of the thighs in the region of the acetabulums, and passing via each of the creases of the superficial dorso-lateral region of the body which join the thigh to the buttock.

9 Claims, 4 Drawing Sheets

(56) References Cited

U.S. PATENT DOCUMENTS

| | | | | |
|---|---|---|---|---|
| 4,451,086 A * | 5/1984 | Seven | ............... | A47C 7/14 297/201 |
| 4,512,608 A * | 4/1985 | Erani | ............... | B62J 1/002 297/201 X |
| 5,709,430 A * | 1/1998 | Peters | ............... | B62J 1/002 297/201 |
| 5,725,274 A | 3/1998 | Bergmeister | | |
| 5,873,626 A * | 2/1999 | Katz | ............... | B62J 1/10 297/202 X |
| 5,911,474 A * | 6/1999 | Lee | ............... | B62J 1/005 297/201 |
| 5,988,740 A * | 11/1999 | Caraballo | ............... | B62J 1/005 297/201 X |
| 6,209,954 B1 * | 4/2001 | Bombardier | ............... | B62J 1/005 297/201 |
| 6,402,235 B1 * | 6/2002 | Letendre | ............... | B62J 1/005 297/201 X |
| 6,786,542 B1 * | 9/2004 | Nuzzarello | ............... | B62J 1/005 297/201 X |
| 7,104,600 B2 * | 9/2006 | Scholz | ............... | B62J 1/005 297/201 |
| 7,249,800 B2 * | 7/2007 | Jalkanen | ............... | A47C 7/022 297/201 X |
| 7,976,102 B2 * | 7/2011 | Chang | ............... | A47C 7/022 297/201 |
| 8,944,501 B2 * | 2/2015 | Tseng | ............... | B62J 1/002 297/201 |
| 2004/0113470 A1 * | 6/2004 | Tobias | ............... | B62J 1/007 297/202 |
| 2007/0210625 A1 * | 9/2007 | Chen | ............... | B62J 1/007 297/202 |
| 2008/0054689 A1 * | 3/2008 | Tucker | ............... | B62J 1/005 297/201 |
| 2015/0145293 A1 * | 5/2015 | Alink | ............... | A61H 3/04 297/201 |

FOREIGN PATENT DOCUMENTS

| | | | | |
|---|---|---|---|---|
| EP | 0734943 A2 | 3/1996 | | |
| GB | 2121740 A * | 1/1984 | ............ | B62J 1/002 |
| WO | 2009/040861 A1 | 4/2009 | | |

OTHER PUBLICATIONS

English-language translation of International Search Report for Application No. PCT/EP2014/067214 dated Oct. 31, 2014.

* cited by examiner

ERGONOMIC SEAT FOR A CYCLE

This application is a 371 application of PCT/EP2014/067214 filed Aug. 12, 2014, which claims foreign priority benefit under 35 U.S.C. §119 of Belgium Application No. BE 2013/0542 filed Aug. 13, 2013.

FIELD OF THE INVENTION

The invention is an ergonomic seating device adapted to the posture, movement and other features of a person on a cycle, in particular a bicycle. The seat is particularly suited to people who cycle regularly, especially for sport.

STATE OF THE ART

Cycling, particularly for long periods, is associated with numerous health problems, as current seats are stiff and constantly press and chafe the body. Such problems are caused by compression of blood vessels and nerves, pressure on the rear thigh and buttock muscles or chafing of connective tissue. This can lead, for example, to chronic perineal pain and damage to or hardening of skin and other tissue.

Document WO2009/040861 describes a bicycle seat with two surfaces for supporting the upper back part of each thigh near the ischial tuberosity. Both surfaces are articulated and mobile, to keep the body from swaying from side to side while pedaling. However, such seats place great pressure on certain parts of the body. Thus, though this system goes some way towards eliminating problems related to lateral sway, problems resulting from pressure on and chafing of sensitive regions remain. Moreover, a seat such as described in the above document does not provide enough support to stabilise the user of the cycle, particularly when the cyclist has a static posture and is not pedaling. Nor is this system easy to adapt to individual users, as the support surfaces are framed by the pendular articulation mechanism. Document EP0734943 also describes a seat with two seating surfaces. Yet those surfaces fail to provide the cyclist with sufficient support.

There is thus a need for an ergonomic seat which can be adapted for individual users, allowing for a better distribution of load pressure on various parts of the body. There is also a need for an ergonomic seat which provides greater stability when the cyclist is static and not pedaling.

SUMMARY OF THE INVENTION

One aim of the present invention is thus to provide a seat for a cycle, such as a bicycle, which will apply less load pressure while ensuring stability, especially when the cyclist holds a static position and is not pedaling. Another aim is for the seat to have a standard part for all users and another part adapted to individual body shape and type. A further aim is to improve seating comfort.

The invented cycle seat comprises two separate seat bases, which can be attached to the cycle by a seat frame. Each seat base has an elongated seating surface, which is mainly horizontal on the proximal side and part of which curves upward on the distal side. Each seat base is 2-10 cm in width, with one end of each distal seating surface at least 4 cm, preferably at least 6 cm and more preferably at least 10 cm higher than the corresponding proximal seating surface. Part of each distal seating surface (4a2, 4b2) also curves forward.

This seat ensures greater contact between the seating surfaces and the body and shifts load pressure to more resistant regions, thus reducing health problems associated with state-of-the-art cycle seats. Moreover, thanks to its shape, each seating surface provides support to particular regions of the body—the proximal seating surface to the ischial tuberosity and the distal seating surface to the outer side of the thigh at least up to the hip joint. Load pressure is thus spread over a larger area. The elongated shape also provides continuous support between the proximal and distal seating surface by better matching the shape of the body, without compressing the pelvis muscles. In addition, each seat base is easy to detach from the seat frame, so that different people can use the same cycle without having to change the seat frame. Finally, asymmetrical seat bases are easier to fit and use on the invented seat than on state-of-the-art seats, providing greater comfort for users with asymmetrical legs due to a hip malformation or accident.

In a preferred embodiment of the invention, each seat base is attached to the seat frame by means of a first and second pivot respectively.

In this embodiment, each seat base is movable, allowing for proper positioning of seating surfaces when the cyclist is sit down. This ensures even better distribution of load pressure, placing more weight on the distal than on the proximal seating surfaces. Less pressure is thus applied to the ischiatic tuberosities, further reducing health problems related to body support. Weight is shifted from the ischium to the side of the pelvis, hip and upper thigh when the cyclist is seated, with the pelvis resting on the seat. As the distal seating surfaces provide support to the outer side of the thigh up to the hip joint, a region less sensitive to load pressure, less pressure is applied to regions in contact with the proximal seating surfaces, reducing health problems in those regions. This makes the seat more ergonomic, further reducing problems associated with regular cycling. This embodiment of the seat ensures better distribution of load pressure on the pelvis, whether the cyclist holds a static position or not (i.e. is not pedalling), and provides greater stability.

An even more preferred embodiment of the seat is for the seating surfaces (4a, 4b) to be spaced at least 6 cm apart at the proximal end of each proximal seating surface.

This embodiment eliminates load pressure on the perineum due to contact with seating surfaces. This preferred embodiment of the seat also keeps leg rotation parallel to the longitudinal vertical plane of the cycle during pedaling, as the legs can stay parallel to the frame of the cycle with no perineal chafing.

The invention is defined by the independent claims. The dependent claims define the preferred embodiments of the invention.

BRIEF DESCRIPTION OF FIGURES

The above and other features of the invention are detailed in the descriptions of the particular embodiments of the invention, with reference to the following figures:

FIG. 1(a) is a front view of this first embodiment. FIG. 1(b) is a side view of this first embodiment along the AA' axis of the seat.

FIG. 2(a) is a front view of this second embodiment. FIG. 2(b) is a side view of this second embodiment along the AA' axis of the seat. FIG. 2(c) is a top view of this second embodiment.

The figures are not drawn to scale. Similar parts are generally denoted by similar references in the figures. Reference numbers in the drawings should not be regarded as restrictive, even when mentioned in the claims.

DETAILED DESCRIPTION OF PARTICULAR EMBODIMENTS

Figure 1:
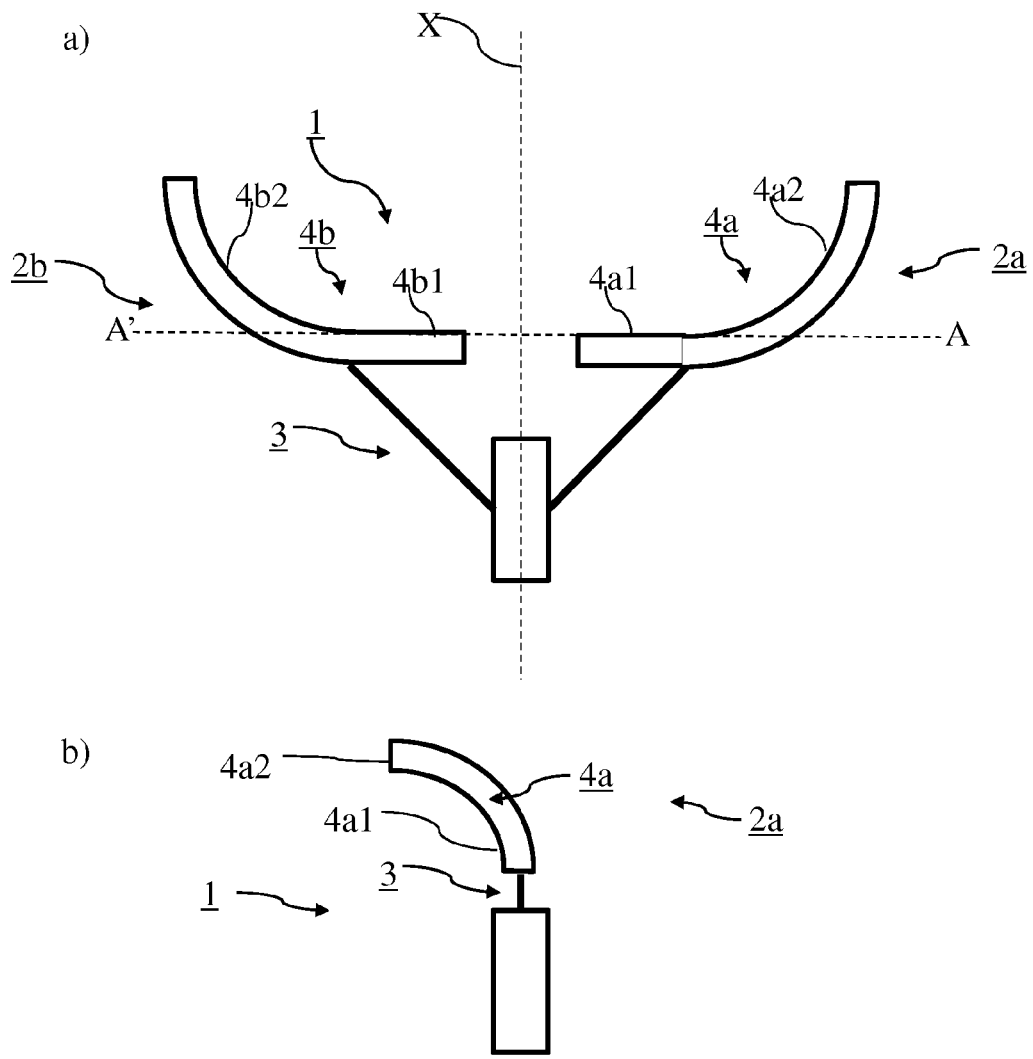
FIG. 1 is a schematic illustration of a first embodiment of the seat.

Refer first to FIG. 1(a). The cycle seat (1) comprises two separate seat bases (2a, 2b), which can be attached to the cycle by means of a seat frame (3). Each seat base (2a, 2b) has an elongated seating surface (4a, 4b), which is mainly horizontal on the proximal seating surface (4a1, 4b1) and part of which curves upward on the distal seating surface (4a2, 4b2).

Each seating surface (4a, 4b) is 2-10 cm in width.

One end of each distal seating surface (4a2, 4b2) is at least 4 cm, preferably at least 6 cm and more preferably at least 10 cm higher than the corresponding proximal seating surface (4a1, 4b1).

Part of each distal seating surface (4a2, 4b2) also curves forward.

For the purposes of this invention, a cycle is defined as a vehicle with one or more (preferably at least two) wheels and driven by muscular energy, in particular by pedaling. A cycle may be, for example, a bicycle, tricycle or motorcycle. The seat frame (3) can be any structure capable of attaching the seat bases (2a, 2b) to the cycle (10) and supporting them, such as the solid, horn-shaped frame illustrated in FIG. 1(a). The seat frame (3) can be made of steel, carbon fiber, aluminum, titanium or an alloy thereof, with at least one part attaching the seat bases to the cycle. The seat frame (3) may comprise two separate parts (3), each supporting a seat base (2a, 2b), as shown in FIG. 1(a). Or the seat frame (3) may comprise a single piece supporting both seat bases (2a, 2b). The seat bases (2a, 2b) can be attached to the seat frame (3) by a screw, groove, hub or any equivalent means.

Preferably, the two seat bases (2a, 2b) should be made of a rigid material, such as carbon, resin, wood, metal, epoxy, polyamide or polypropylene, may be reinforced with fiber and may be covered with a flexible material for greater comfort. Preferably, one or more pads, preferably inflatable, may be placed on each seat base (4a, 4b) to increase contact and improve comfort.

Each seat base (2a, 2b) includes a seating surface (4a, 4b). The seating surface (4a, 4b) is the surface of a seat base designed to be in contact with the body when the cyclist is seated. Each seating surface (4a, 4b) includes a proximal seating surface (4a1, 4b1) located near the frame of the cycle. Each seating surface also includes a distal seating surface (4a2, 4b2) located farther from the frame of the cycle. The proximal seating surfaces (4a1, 4b1) are mainly flat and horizontal. Preferably, the proximal seating surfaces (4a1, 4b1) should move away from the frame of the cycle in a direction more or less perpendicular to its longitudinal plane of symmetry (X). Each seating surface (4a, 4b) is elongated, measuring 2-10 cm, preferably 3-8 cm and more preferably 4-6 cm in width. This width is not necessarily identical at all points of the seating surface. For example, the seating surface may be wider on the proximal seating surface (4a1, 4b1) than elsewhere, or vice versa. Each proximal seating surface (4a1, 4b1) is mainly horizontal, facing upward so as to provide support to the ischial tuberosities when the cyclist is seated (1). Part of each distal seating surface (4a2, 4b2) curves upward so as to provide continuous support when the cyclist is seated (1), from the proximal seating surface (4a1, 4b1) to the end of the distal seating surface (4a2, 4b2), which supports the outer side of the thigh at least up to the hip joint. One end of each distal seating surface (4a2, 4b2) is at least 4 cm, preferably at least 6 cm, more preferably at least 10 cm and even more preferably at least 15 cm higher than the corresponding proximal seating surface (4a1, 4b1). The invented seat (1) thus includes two seating surfaces (4a, 4b), providing ergonomic support. The curvature and length of each seating surface (4a, 4b) may vary, depending on individual body type and shape. For the purposes of this invention, the side of the thigh may be regarded as including the upper thigh and the side of the hip where the hip rotates.

Preferably, each proximal seating surface (4a1, 4b1) should be 6-10 cm in length. Alternatively or in addition, each distal seating surface may be 12-18 cm in length.

The forward curvature of each distal seating surface is illustrated in FIG. 1(b). Thus, each distal seating surface (4a2, 4b2) has an first portion curving upward and a second portion curving forward. These curvatures may be separate or at least partly combined. For example, part of each distal seating surface (4a2, 4b2) may curve both upward and forward. Or part of each distal seating surface (4a2, 4b2) may curve only upward, part of it forward and upward, and part of it only forward. The invented seat ensures a better distribution of load pressure and enhances sitting comfort thanks to the forward curvature, which follows the shape of the body. This curvature of the seat (1) is better adapted to individual body types and shapes. The seating surfaces (4a, 4b) thus provide ergonomic support.

A seat (1) with these features provides support to the ischiatic tuberosities and outer thighs along an axis passing through each hip joint, as well as to each area between the ischial tuberosity and the outer thigh, i.e. along the dorsolateral fold where the curvature of the buttock ends and the thigh begins. These areas include the ischial tuberosity (enlargement of the anterior ischium at the point where the ischium meets the pubis), the dorsolateral fold where the thigh meets the buttock, as well as the muscles, hamstrings and fascia on the outer side of the thigh, along the iliac crest and an axis passing through each hip joint, with particular support to the greater trochanter of the femur.

The hip joint is the region of the hip where the head of the femur meets the socket of the hip bone. The distal seating surface (4a2, 4b2) of each seat base (2a, 2b) is in contact with the side of the thigh, supporting the thigh muscles up to at least an area along an axis passing through each hip joint and thus distributing pressure and friction more evenly than current seats. Support for the muscles at least up to an area on the side of the thigh along an axis passing through each hip joint also enhances stability, particularly when the cyclist holds a static position and is not pedaling.

Each seat base (2a, 2b) may provide continuous support, with no interruption in the seating surfaces (4a, 4b) between the proximal (4a1, 4b1) and distal seating surface (4a2, 4b2) and with each seating surface (4a, 4b) extending from the proximal (4a1, 4b1) to the distal seating surface (4a2, 4b2) of the seat base (2a, 2b). Or each seating surface (4a, 4b) can comprise several overlapping or interlocking surfaces. For example, each proximal seating surface (4a1, 4b1) can be attached to the seat frame, with the distal seating surfaces (4a2, 4b2) not attached to the frame when the seat is not in use. When the seat is in use, each distal seating surface (4a2, 4b2) can be attached to the corresponding proximal seating surface by using a means of attachment such as a male-female linking rod or by having at least part of each distal seating surface (4a2, 4b2) overlap at least part of the corresponding proximal seating surface (4a1, 4b1). In this embodiment, the distal seating surfaces (4a2, 4b2) can be placed in a garment, such as a pair of shorts with pockets; when the seat is used, each distal seating surface (4a2, 4b2) overlaps the proximal seating surface (4a1, 4b1) to form one continuous seating surface (4a, 4b).

In one embodiment of the invention, at least the first portion of each seat base (2a, 2b) can operate directly in combination with the seat frame (3). Preferably, one portion of each seat base (2a, 2b), which operates directly in combination with the seat frame (3), should include the proximal seating surface (4a1, 4b1). Another portion of each seat base (2a, 2b), which completes the seating surface (4a, 4b), can be placed in or on a garment so as to operate in combination with the first portion of the seat base (2a, 2b) when the cyclist is sitting. Such combined operation may, for example, be ensured by having at least part of the second portion of each seat base overlap at least part of the proximal seating surface (4a1, 4b1). In an advantageous embodiment, the top surface of the first portion of each seat base (2a, 2b) may include a means of facilitating combined operation and reducing sliding between the first and second portions of the seat base (2a, 2b). For example, the first portion of each seating surface (4a, 4b) can have ridges on top, preferably along an axis perpendicular to the cycle's plane of symmetry, and the second portion of each seat base (2a, 2b), which operates in combination with the first portion, may have ridges on the bottom to fit into the ridges on the first portion. In this embodiment, each seat base (2a, 2b) comprise at least two separate pieces, which combine to form the seating surfaces (4a, 4b). One of these pieces can be attached to the seat frame (3), and the second piece can be placed in a garment pocket, or sewn or glued onto a garment. When the cyclist is seated, the second pieces at least partly overlap the first pieces, forming the seating surfaces (4a, 4b).

Preferably, the forward and/or upward curvature should be such that the end of each distal seating surface (4a2, 4b2) is flat, lying mainly parallel to the cycle's longitudinal plane of symmetry (X), with its width mainly vertical. Preferably, each distal seating surface (4a2, 4b2) should curve forward and upward so that the end of each distal seating surface (4a2, 4b2) touches the outer side of the thigh along an axis passing through each hip joint, 2-4 cm above the end of the greater trochanter. Such an arrangement provides greater support to the legs as they bend and extend during pedaling.

In a preferred embodiment of the invention, the upward curvature of each distal seating surface (4a2, 4b2) represents at least 50% and more preferably at least 75% of the length of the corresponding distal seating surface (4a2, 4b2).

In a preferred embodiment of the invention, the forward curvature of each distal seating surface (4a2, 4b2) represents at least 25% and more preferably at least 50% of the length of the corresponding distal seating surface (4a2, 4b2).

Figure 2:
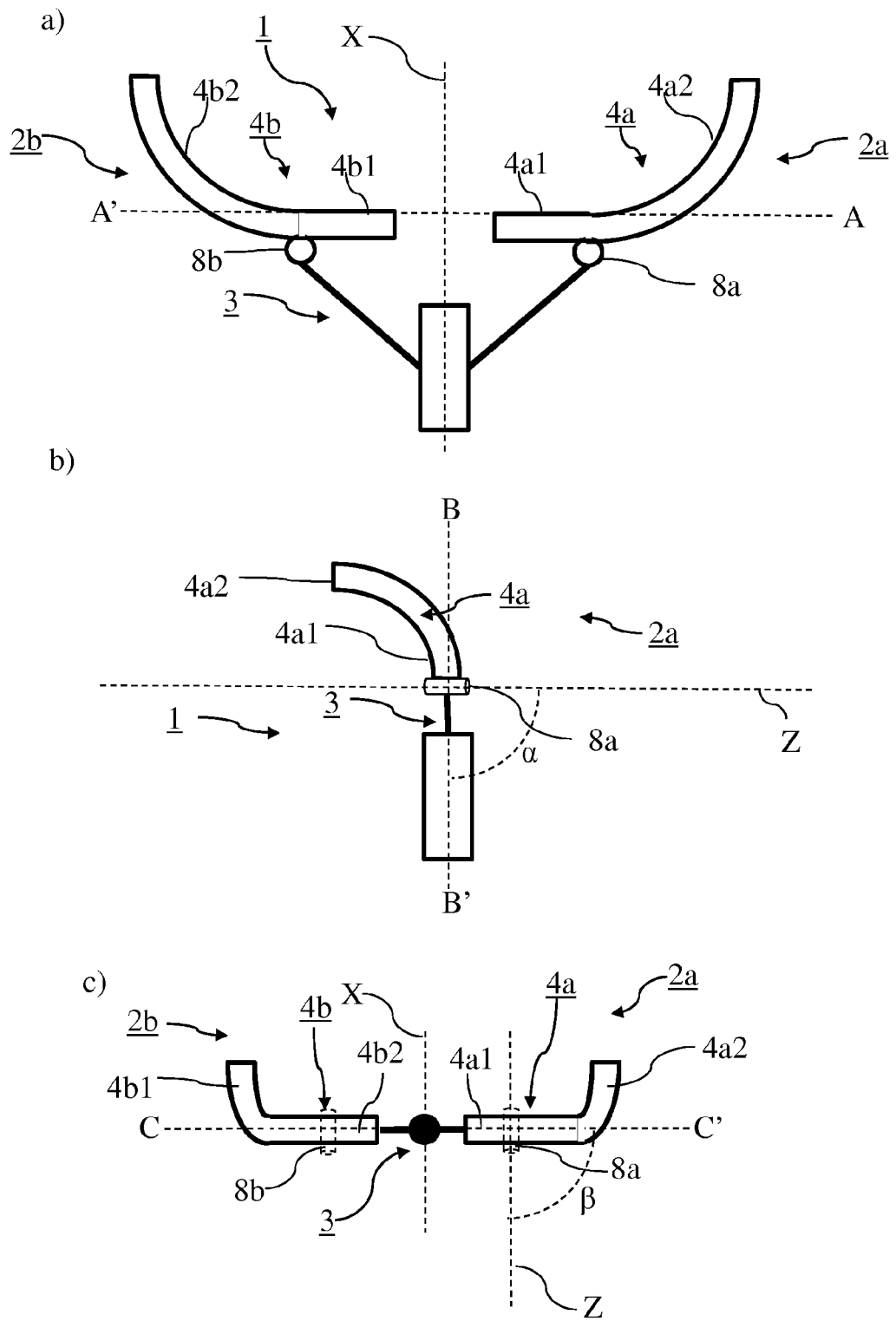
FIG. 2 is a schematic illustration of a second embodiment of the seat.

In one embodiment of the invention, illustrated in FIG. 2, each seat base (2a, 2b) is attached to the seat frame (3) by means of a first (8a) and second (8b) pivot.

In this embodiment, each pivot (8a, 8b) attaches the seat frame (3) to one of the seat bases (2a, 2b), while allowing the seat bases (2a, 2b) to swivel on the pivot (8a, 8b). When the seat (1) is in use, the swiveling movement ensures better distribution of load pressure regardless of the cyclist's posture and movement, allowing the seating surfaces (4a, 4b) to stay in contact with the body at all times.

Preferably, as illustrated in FIG. 2(a), two pivots (8a, 8b) should be located symmetrically on the seat frame (3), on either side of the cycle's longitudinal plane of symmetry (X).

In a particular embodiment, illustrated in FIG. 2(b), the first pivot (8a) and the second pivot (8b) on the seat (1) each form a first angle ($\alpha$) with respect to a vertical line (BB') parallel to the cycle's longitudinal plane of symmetry (X) and passing through the pivot. Angle ($\alpha$) is 45°-135°, preferably 70°-110°, more preferably 80°-100° and even more preferably 85°-95°. A straight line passing through a pivot (8a) is shown as Z in FIGS. 2(b) et 2(c). In the particular embodiment shown in FIG. 2(b), angle ($\alpha$) is 90°.

In this embodiment, the pivots (8a, 8b) are relatively parallel to the ground, so that the seat bases (2a, 2b) can swivel on an axis relatively horizontal with respect to the ground when the cycle is on flat terrain, allowing for better seating.

In an alternative or additional embodiment, shown in FIG. 2(c), the first (8a) and second (8b) pivots each form a second angle ($\beta$) with respect to a horizontal line (CC') perpendicular to the cycle's longitudinal plane of symmetry (X). The second angle ($\beta$) is 75°-105°, preferably 80°-100°, more preferably 85°-95° and even more preferably 90°. In the particular embodiment shown in FIG. 2(c), the second angle ($\beta$) is 90°.

Figure 3:
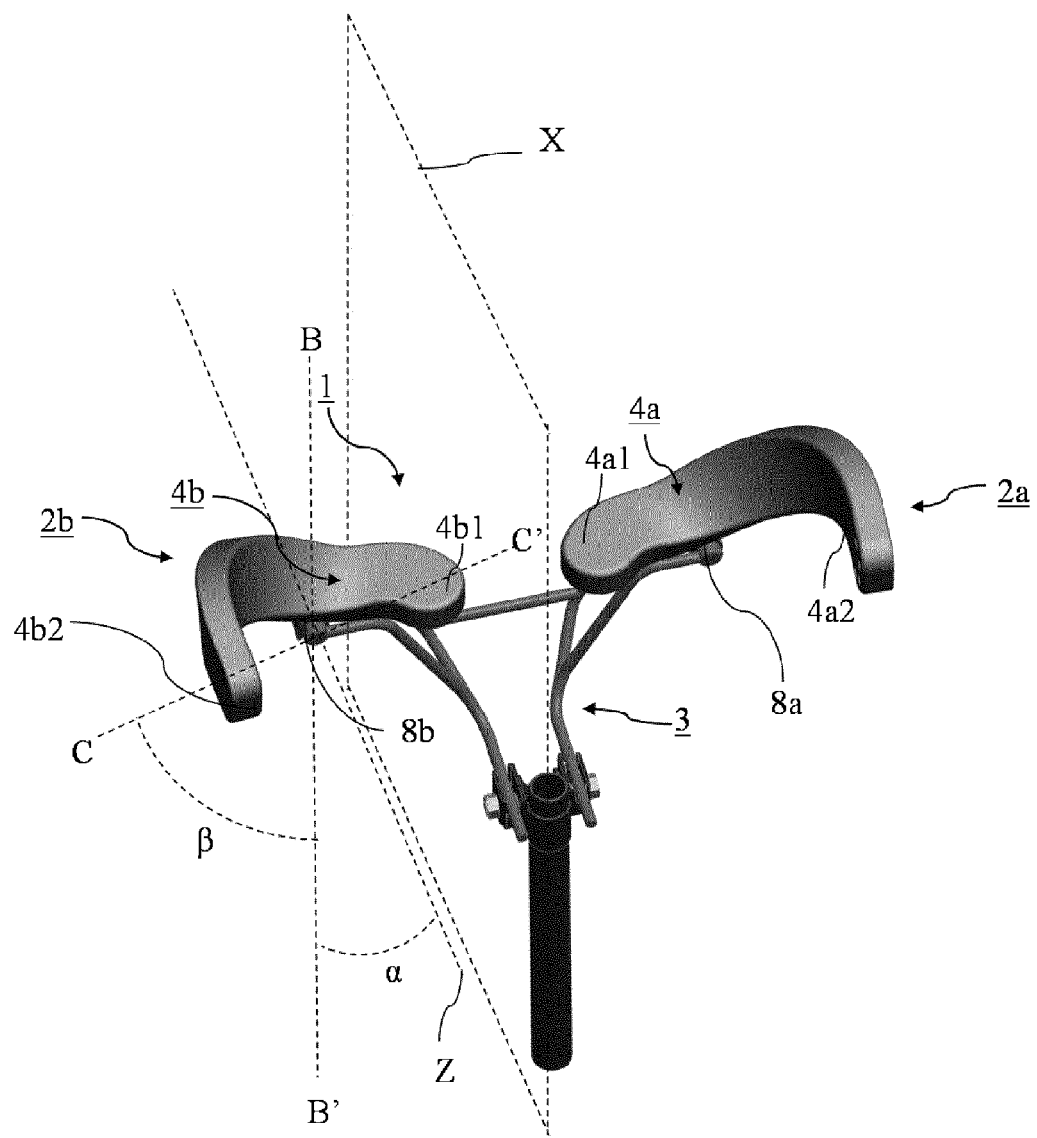
FIG. 3 is a schematic illustration of a seat in one of the embodiments of the invention.

In this embodiment, each pivot (8a, 8b) is mainly oriented parallel to the frame of the cycle, so that the seat bases (2a, 2b) can swivel easily towards the frame of cycle when the seat is in use, enhancing stability and increasing load pressure on the distal seating surfaces (4a2, 4b2), while reducing pressure on the proximal seating surfaces (4a1, 4b1), this ensures a better distribution of load pressure and further reduces health problems related to cycling. The particular embodiment for the invention illustrated in FIG. 3 shows the seat bases (2a, 2b) attached to pivots (8a, 8b) which are mainly horizontal and parallel to the frame of the cycle, with the distal seating surfaces (4a2, 4b2) curving forward and upward. In other words, the first angle ($\alpha$) and the second angle ($\beta$) are 90° for both the first (8a) and the second (8b) pivot.

In a preferred embodiment, each pivot (8a, 8b) on the seat (1) should form a first angle ($\alpha$) of 80°-100° and a second angle ($\beta$) of 80°-100°. Even more preferably, the first (8a) and second (8b) pivots should each form a first angle ($\alpha$) and a second angle ($\beta$) both equal to 90°.

Preferably, the pivots (8a, 8b) should be located below a horizontal plane (AA') tangent to the lowest part of the seating surfaces (4a, 4b), as shown in FIG. 2(a).

In this embodiment, the first (8a) and second (8b) pivots are located below each seating surface (4a and 4b respectively), allowing for a smaller seat frame (3) which allows the seat bases (2a, 2b) to swivel.

In one particular embodiment, it is possible to limit swiveling by adding, for example, at least one stop. Each seat base (2a, 2b) thus attaches to the first (8a) and second (8b) pivot respectively, with a freedom of rotation of less than 30°.

In this embodiment, the freedom of rotation of the seat bases (2a, 2b) is limited, to stop them from swiveling too much, which could cause the cyclist to fall.

Preferably, in any of the embodiments described above, the seat (1) should be free of a saddle nose (a portion of the saddle extending forward under the perineum). The seat (1) is designed so as to avoid contact with the perineum. In this embodiment, the seat bases (2a, 2b) are arranged so that there is no contact between the seating surfaces (4a, 4b) and the perineum.

It is thus possible to arrange the seat bases (2a, 2b) on the seat frame (3) so that the seating surfaces (4a, 4b) are at least 6 cm apart at the proximal end of the proximal seating surfaces (4a1, 4b1). This arrangement greatly enhances user comfort. The proximal end of a seating surface (4a, 4b) is the point of the proximal seating surface (4a1, 4b1) closest to the frame of the cycle.

In a preferred embodiment for the invention (1), each seat base (2a, 2b) of the seat (1) can be detached from the seat frame (3). More preferably, each seat base (2a, 2b) should attach to the pivots (8a, 8b) in such a way as to be easily detached.

In this embodiment, it is possible to use several different pairs of seat bases (2a, 2b) on the same cycle and with the same seat frame (3), either in order to use seat bases (2a, 2b) with seating surfaces (4a, 4b) adapted to a given body type and shape or for a particular type of cycle use, for example one seat (1) for sport and another for recreational use.

Figure 4:
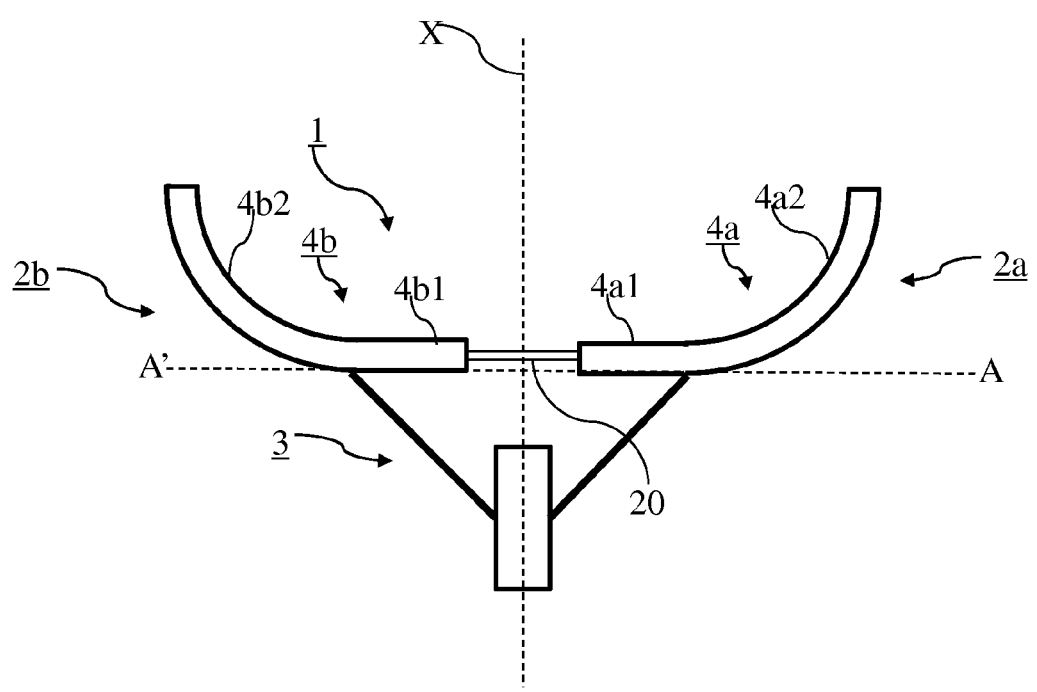
FIG. 4 is a schematic front view of a seat in a third embodiment of the invention.

In one embodiment, illustrated in FIG. 4, the cycle seat may include a linking rod (20). When the seat bases (2a, 2b) are placed in a garment, the linking rod (20) may be present between the proximal portion (4a1) of the first seat base (2a) and the proximal portion (4b1) of the second seat base (2b); the linking rod can also be placed in a garment along with the seat bases (2a, 2b). The linking rod (20) may be as wide as or less wide than each proximal seating surface (4a1, 4b1). The linking rod (20) may be mainly rectangular in shape. Each side of the linking rod (20) may be attached along all or part of its length to one of the proximal seating surfaces (4a1, 4b1). The linking rod (20) is flexible and can bend with the movements of the seat bases (2a, 2b) and of the cyclist. However, the linking rod (20) should preferably be made from a non-extensible material (e.g. polyethylene, like canvas, or polyvinyl chloride or woven fabric), so that the distance between the proximal portion (4a1) of one seat base (2a) and the proximal portion (4b1) of the other seat base (2b) may never be greater than the length of the linking rod (20). The length of the linking rod is defined as the length perpendicular to each side of the rod (20) attached to one of the seat bases. Placed thus between the proximal portions (4a1, 4b1), the linking rod (20) allows the seating surfaces (2a, 2b) to swivel and ensures better seating, by preventing the seat bases from moving too far apart. This makes seating even more comfortable and further improves overall balance. Preferably, the linking rod should be 4-15 cm and more preferably 6-10 cm in length. Preferably, the linking rod should be attached to the seat bases (2a, 2b) on a plane tangent to the proximal seating surfaces (4a1, 4b1).

The invention also includes a method of manufacturing a seat (1) in any of the embodiments described above.

The manufacturing method involves determining the average width of each seating surface (2a, 2b) and the height of each distal seating surface (4a2, 4b2) for an individual user, based on the anatomy of the upper back part of each thigh, the outer side of each thigh at the hip joint and each region between the upper back part of each thigh and the outer side of each thigh.

The seating surfaces (2a, 2b) of any seat (1) manufactured with this method are perfectly adapted to the user's body.

Preferably, the method should also involve determining the forward curvature of each distal seating surface (4a2, 4b2) for an individual user, based on the anatomy of the outer side of each thigh up to the hip joint.

Any seat (1) manufactured in this embodiment is even better adapted to the specific features of the user's body.

The invention has been described in terms of specific embodiments, which are purely illustrative and should not be regarded as restrictive. In general, it will be clear to the professional reader that the invention is not limited to the examples illustrated and described above. Reference numbers in the drawings should not be regarded as restrictive, even when mentioned in the claims.

Use of any form of verbs such as 'consist', 'include' or 'have' does not mean that only the parts mentioned are present.

Use of the singular indefinite or definite article to introduce a part does not mean that only one such part is present.

The invention may also be described as follows:

The invention relates to a seat (1) for a cycle, comprising two seating surfaces which are curved upward and forward to allow a user to be supported continuously in the precise anatomical regions situated under each ischium, under the upper dorsal part of the thighs as far as a ventro-lateral part of the thighs in the region of the acetabulums, and passing via each of the creases of the superficial dorso-lateral region of the body which join the thigh to the buttock. The invention also relates to a method of manufacturing a seat (1) according to the invention.

The invention claimed is:

1. A cycle seat comprising two seat bases and a seat frame to attach the seat bases to a cycle, wherein each seat base has an elongated seating surface with a mainly horizontal proximal seating surface and a distal seating surface, part of which curves upward, wherein each seating surface is 2-10 cm in width, and wherein one end of each distal seating surface is at least 4 cm higher than the corresponding proximal seating surface, and further wherein a part of each distal seating surface curves forward, wherein each seat base is mounted on the seat frame by means of a first pivot and second pivot respectively, wherein the first pivot and second pivot each form a first angle ($\alpha$) comprised between 80° and 100° with respect to a vertical line (BB') parallel to the longitudinal plane of symmetry (X) of the cycle and passing through the pivot, wherein the first pivot and second pivot each form a second angle ($\beta$) comprised between 80° and 100° with respect to a horizontal line (CC') perpendicular to the longitudinal plane of symmetry (X) of the cycle.

2. The cycle seat according to claim 1, wherein the upward curvature of each distal seating surface represents at least 50% of the length of the corresponding distal seating surface.

3. The cycle seat according to claim 1, wherein the forward curvature of each distal seating surface represents at least 25% of the length of the corresponding distal seating surface.

4. The cycle seat according to claim 1, wherein the first and second, pivots are located on a horizontal plane (AA') tangent to a lowest part of each seating surface.

5. The cycle seat according to claim 1, wherein each seat base is attached to the first pivot and second pivot respectively with a freedom of rotation of less than 30°.

6. The cycle seat according to claim 1, wherein the seating surfaces are spaced at least 6 cm apart at a proximal end of each proximal seating surface.

7. The cycle seat according to claim 1, wherein each seat base can be detached from the seat frame.

8. The cycle seat according to claim 1, wherein each seat base comprises at least two separate pieces overlapping at least partially to form the seating surface.

9. The cycle seat according to claim 1, wherein a linking rod connects the proximal seating surfaces.

* * * * *